Jan. 25, 1944. K. RATH 2,340,141
VISUAL EXPOSURE METER
Filed Oct. 8, 1941 2 Sheets-Sheet 1
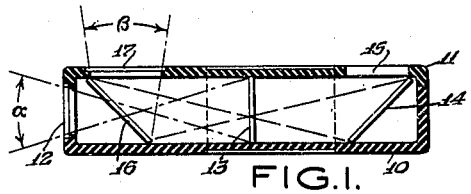
FIG.1.
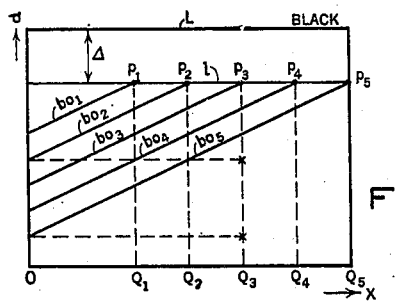
FIG.5-A.
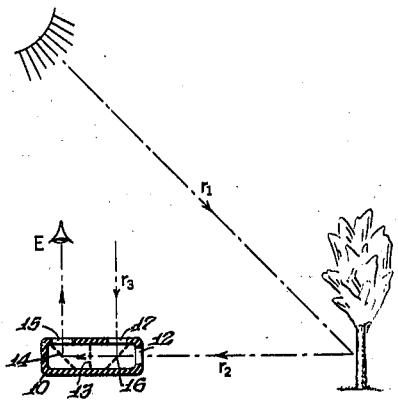
FIG.3.
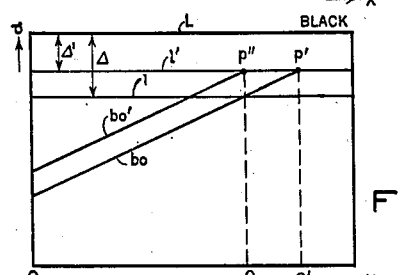
FIG.5-B.
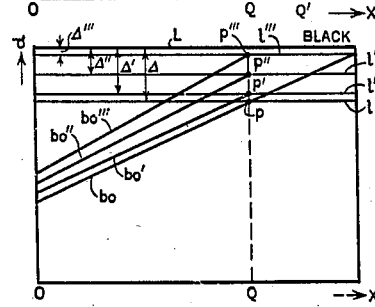
FIG.5-C.
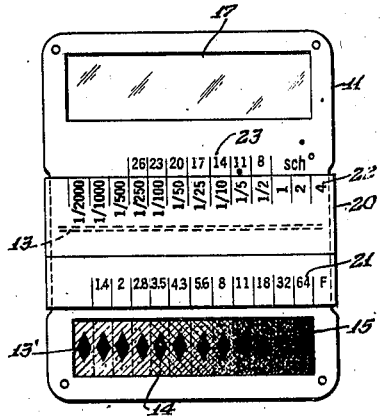
FIG.2.
FIG.5-E.
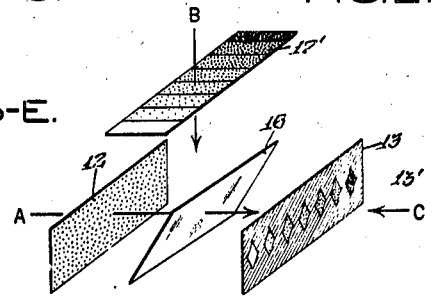
FIG.6.
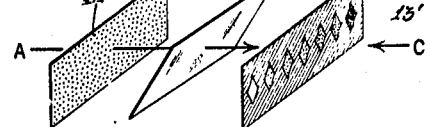
FIG.4.
INVENTOR.

Jan. 25, 1944.                K. RATH                2,340,141
                        VISUAL EXPOSURE METER
                        Filed Oct. 8, 1941          2 Sheets-Sheet 2
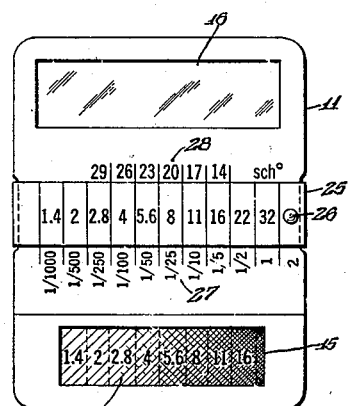
FIG. 7.
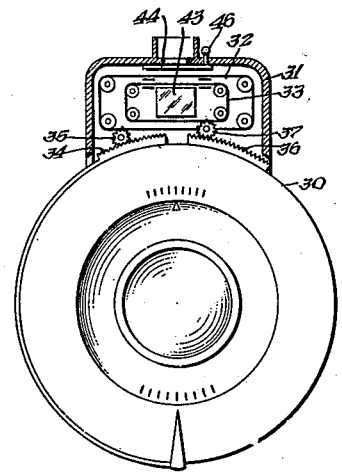    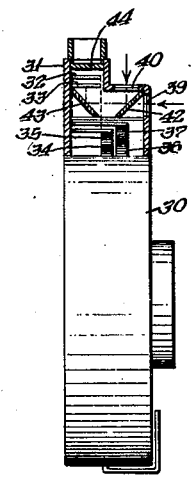
FIG. 8.            FIG. 9.
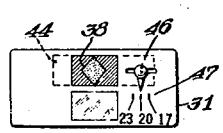    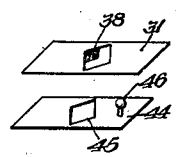
FIG. 10.           FIG. 11.
INVENTOR Patented Jan. 25, 1944

2,340,141

UNITED STATES PATENT OFFICE 2,340,141

VISUAL EXPOSURE METER

Karl Rath, New York, N. Y.

Application October 8, 1941, Serial No. 414,058

7 Claims. (Cl. 88—23)

My invention relates to photographic exposure meters, more particularly to visual exposure meters of the "extinction" type which serve to determine or adjust the proper lens aperture and shutter speed of a photographic camera in accordance with an existing scene or object brightness in order to obtain a correctly exposed photograph.

Extinction type exposure meters essentially are visibility meters operated on the zero or compensation principle by determining the extinguishment or approach to zero visibility of a distinct test mark or area with respect to an adjacent standard area or background, one of said areas being illuminated in accordance with the brightness of the scene or object to be photographed.

In contrast to known visibility meters for determining the visual efficiency of a person's eyes operated in a room under a standard and constant illumination, exposure meters have to be used under the most varied lighting conditions to which the observer's eyes are exposed, ranging from bright sunlight to dark shadows and indoor scenes. As is well known, the sensitiveness or acuity of vision of the human eye varies considerably under the various lighting conditions to which the eye is exposed and as a result thereof a measurement or exposure determination made e. g. from an object or scene of like brightness will vary to a substantial extent depending on whether the measurement is made in bright daylight, under a cloudy sky or in dark surroundings such as shadowy streets, forests or interiors.

This error in the exposure data obtained from an extinction type exposure meter due to the varying eye sensitivity has been well known in the past and various remedies therefor have been suggested all of which possess great disadvantages in one or the other respect.

Accordingly, an object of my invention is the provision of an extinction type exposure meter embodying means for automatically compensating for the error due to the varying eye sensitivity substantially without necessitating any additional adjustment, estimation of lighting conditions, operation of the meter in an inconvenient position, allowance for adaptation time and other defects and drawbacks inherent in the construction and operation of meters of this type heretofore known in the art.

Another object is the provision of a meter of the above character which is both simple in design and easy to operate and which is characterized by high accuracy and reliability even in the hands of the less skilled and experienced photographer.

Still another object is to provide a simple and highly reliable extinction type exposure meter suitable for structural combination with the exposure adjusting devices of a camera.

The above and further objects and novel aspects of my invention will become more apparent from the following detailed description taken with reference to the accompanying drawings forming part of this specification and wherein:

Figure 1 is a longitudinal cross-sectional view of an exposure meter constructed in accordance with the principles of the invention, Figure 2 is a top view of the meter shown in Figure 1, Figure 3 is a diagram illustrating the operation of the invention, Figure 4 is a perspective detailed view of the photometric wedge and reflector arrangement of the meter according to Figures 1 and 2, Figures 5A to 5E are theoretical diagrams explanatory of the function of the invention, Figure 6 is a view similar to and showing a modification of Figure 4, Figure 7 is a top view of a modified meter construction embodying the principles of the invention, Figure 8 is a cross-section through a meter according to the invention structurally combined with the shutter and lens diaphragm control of a camera, Figure 9 is a side view partly in cross-section of Figure 8, Figure 10 is a top view of the meter shown in Figure 8 and Figure 11 is a detailed view illustrating the operation of the arrangement according to Figures 8 to 10.

Like reference characters identify like parts throughout the different views of the drawings.

Referring to Figures 1 and 2, I have shown a meter for use as an accessory to a camera comprising a flat rectangular casing made of metal or preferably a moulded plastic such as Bakelite and having a bottom portion 10 and a top or cover 11 secured thereto in any suitable manner. The front wall of the casing is provided with an oblong opening 12 to admit light rays radiated or reflected from a photographic object or scene if the meter is held in the operative position with the opening 12 aimed towards the object. Opening 12 may be covered by a translucent or diffusing plate of Celluloid, frosted glass or the like. Mounted within the casing is a photometric or step wedge 13 in spaced relation to the opening 12 so as to obtain a definite effective viewing angle α of the meter corresponding to or being less than the view or field angle of the camera, that is about 45° for the average camera. The wedge 13 consists in a known manner of a neutral varying density filter and in the example shown in Figure 2 has a gradually decreasing transparency or increasing opacity from left to right. There are provided on the wedge 13 a series of preferably equally spaced test marks or areas 13' of like opacity. The marks shown in the drawing are of diamond shape but, may have any desired configuration and are shown completely black or of 100% opacity. Alternatively, marks 13' may be provided which have a varying opacity while the surrounding areas are black or 100% opaque as shown in Figures 4 and 6. A photometric wedge of this type may be easily manufactured by a photographic printing method and may consist either of a single strip or of a pair of superimposed strips one of which constitutes the wedge proper of gradually or step-by-step varying density while the other strip is black with areas representing the marks 13' being transparent or cut out in the manner of a stencil. There is further provided at the rear end of the casing a reflector or mirror 14 inclined at an angle of about 45° to deflect the light rays passing the wedge 13 in a substantially vertical direction through the sighting or viewing aperture 15 in the rear portion of the top wall 11.

According to the improvements of the present invention, a second partially reflecting or semi-transparent mirror 16 is provided near the front opening 12 inclined in a direction opposite to the mirror 14 to deflect light rays entering the casing through a further opening 17 in the top wall 11, preferably covered by a diffusing plate in the direction towards the wedge 13. In this manner the illumination of the wedge is due to the combined light rays entering the opening 12, determined by the brightness of the object or scene to be photographed (angle α), and the light rays (angle β) emanating from the surrounding space and corresponding to general lighting conditions determinative of the eye sensitivity under which a reading is made by the photographer. This is more clearly understood by reference to Figure 3 wherein the broken line $r_1$ indicates the light falling upon the object shown in the form of a tree, $r_2$ represents the reflected light entering the opening 12 of the meter, determining the exposure to be given in order to insure a good photograph, and $r_3$ represents the light rays varying according to the general lighting conditions or light to which the observer's eyes are exposed entering the opening 17. Both $r_2$ and $r_3$ are thus combined to illuminate the wedge 13 viewed by the eye of the observer shown at E.

The manner in which the error due to the varying eye sensitivity is compensated in the arrangement described hereinbefore will be explained in the following with reference to Figures 5A and 5E.

Figures 5A to 5C are plots representing the opacity or degree of darkness $d$ or the reciprocal of the brightness of the wedge shown in Figure 5E as a function of the distance $x$ from the zero point or left end O of the wedge serving as a reference. The parallel line L corresponds to completely black or 100% opacity and line $l$ at a distance $\Delta$ from line L represents the opacity differential between the viewing marks on the wedge and the adjacent areas for which the marks will be just visible or their visibility will approach the zero value if the wedge is illuminated by light of varying intensity and viewed through the sighting aperture 15 by a person possessing normal vision under a predetermined average illumination or lighting condition.

The lines $b_{01}$ to $b_{05}$ correspond to different degrees of scene or object brightness and it is seen that the intersections $p_1$ to $p_5$ of these brightness lines with the line $l$ will determine the distances $OQ_1$ to $OQ_5$ of the marks just barely visible to the observer for the different degrees of object brightness. In other words, the distances $OQ_1$ to $OQ_5$ are an index of the brightness values read for the different degrees of object brightness, the latter increasing in the direction from $b_{01}$ to $b_{05}$. The lines $b_{01}$ to $b_{05}$ are spaced by constant distances if the object brightness varies by substantially equal amounts, including, in the present example, the increase or decrease in illumination of the wedge due to the surrounding lighting conditions as represented by the light rays entering the opening 17 of the meter, and provided the density of the wedge increases substantially linearly in the direction of $x$ in the manner shown.

Referring more particularly to Figure 5B and assuming a given object brightness represents by line $b_0$ and a given eye sensitivity or general lighting condition represented by the distance $\Delta$, and assuming further that opening 17 is closed and the partial reflector 16 omitted, it will be seen, if the eye sensitivity is increased or in other words if the general illumination decreases (change from bright to dark surroundings) or the differential between the marks on the wedge and the adjacent areas just barely visible is decreased to $\Delta'$, that line $b_0$ will intersect the new sensitivity line $l'$ at the point $p'$, resulting in a read object brightness $OQ'$ which is greater than the correct brightness value $OQ$ and which will result in an underexposed negative. However, on account of the reduced additional illumination, line $b_0$ will be shifted to $b_0'$ i. e. in the direction of decreasing illumination due to the decrease of light entering the opening 17, provided the object brightness remains the same, thus resulting in a new intersection point $p''$ and a brightness reading $OQ$ equal to the original value.

Accordingly therefore, by the proper adjustment and coordination of the light bundles entering the openings 12 and 17, the arrangement may be such that the error due to the varying eye sensitivity will be substantially compensated by a proper change in the visibility of or contrast between the testing areas. This is readily understood from the fact that visibility of an area or test mark is dependent upon the size of the mark, its configuration, its brightness and the contrast relative to the surrounding area or background.

The path of the light rays in the meter is further indicated in the perspective view of Figure 4, wherein arrow A represents the light rays radiated or reflected from the object, arrow B represents the light rays entering the meter varying with the general lighting conditions and arrow C shows the direction of viewing of the wedge 13 illuminated by the combined rays A and B.

In general, that is for a person possessing normal vision, the eye sensitivity varies exponentially as indicated in Figure 5C by the distances $\Delta$, $\Delta'$, $\Delta''$ and $\Delta'''$ for the sensitivity lines $l$, $l'$, $l''$ and $l'''$, respectively, corresponding to equal changes in the general illumination or lighting conditions. In order to take this fact into account and to cause the lines $b_0$ to $b_0'''$ to produce intersection points $p$ to $p'''$ all resulting the same read brightness value $OQ$, a further graduated wedge 17' is provided over the opening 17 as shown in Figure 6 having an opacity varying in the same direction as the opacity of the wedge 13, in such a manner that lines $b_0$ to $B_0'''$ will assume different slopes so as to cause all the intersection points $p$ to $p'''$ to lie above point $Q$ corresponding to the true object brightness.

There is thus described in the foregoing an arrangement for determining an existing object brightness by means of a meter operating on the extinction principle which will automatically compensate for the varying eye sensitivity without necessitating any special adjustment or judging of the existing lighting condition, thereby greatly simplifying the operation and increasing the accuracy and reliability of a meter of this type.

The brightness value read (distance $OQ$) may be evaluated or converted into the proper lens aperture and shutter speed values in any suitable manner such as by means of a direct reading scale arrangement as shown in Figure 2 and described in greater detail in my copending patent application Ser. No. 393,007 filed May 12, 1941, now Patent No. 2,323,676, issued July 6, 1943, entitled Photographic exposuremeter.

Referring to Figure 2, I have shown a relatively movable scale member 20 having the form of an endless band placed around the casing and provided with a pair of adjacent lens aperture and shutter speed scale 21 and 22 respectively, the former being arranged adjacent and in cooperative relation to the graduated wedge appearing in the viewing aperture or slot 15. I have provided a further scale 23 adjacent to scale 22 calibrated in film speed numbers and fixedly applied to the top face of the casing.

In operation, scale member 20 is set so that a chosen shutter speed is opposite to the speed number for the film or plate used in the camera. This setting may be retained as long as the same speed and film are used. The correct aperture number may then be read opposite to the mark in the viewing slot which is just barely visible substantially without requiring any additional setting or adjustment during each measurement. Suitable arresting means may be provided to prevent displacement of the scale members once a setting has been made. This method is of special importance in connection with the practice preferred by many photographers of employing a given shutter speed, say 1/50 or 1/100 sec., for the majority of cases or in case of moving picture cameras having a fixed shutter speed or frame number. It is however also possible to interchange the scales 21 and 22 in which case a given aperture chosen in advance will result in a direct indication of the correlated shutter speed as is readily understood.

If instead of a single indication obtained with a meter shown in Figures 1 and 2, it is desirable to choose any pair of correlated aperture and shutter speed values, a modified meter construction may be employed as shown in Figure 7. In the latter, which otherwise is of the same construction as the meter shown in Figure 2, the measuring marks on the photometric wedge are in the form of brightness numbers representing, in the example shown, a scale of aperture values from 1.4 to 16 according to the well known F-system. The movable scale member 25 provided with an operating knob 26 has applied thereto a similar aperture scale in cooperative relation with a shutter speed scale 27 and a film speed scale 28, respectively, the latter being applied to the top face of the casing. The operation of this meter is as follows:

After the number just barely visible in the viewing aperture 15 has been ascertained, the same number on the member 25 is set so as to be opposite the speed number of the film used, whereby the aperture and shutter speed scales will be properly aligned so that any two correlated values may be selected as desired to comply with existing picture taking requirements.

It will be evident from the foregoing that the invention is not limited to exposure meters based on the extinction principle of the type comprising a photometric wedge provided with a consecutive series of brightness numbers or test marks all visible to the observer. The new method of compensating for the error due to the varying eye sensitivity may be applied with equal advantage to other types of meters such as those wherein a single test mark or field is sighted through a viewing opening or peep hole and the brightness or visibility is reduced to zero by adjusting a light dimming device such as an iris diaphragm or a photometric wedge placed in the path of the light bundle illuminating the mark or aperture. In arrangements of this type, the area surrounding the viewing aperture constitutes an opaque standard for comparison with the area within the aperture whose brightness varies according to the brightness of the scene or object to be photographed in the operative position of the meter. By composing the light bundle of combined light rays emanating both from the object of regard as well as from the surrounding space in accordance with the invention, the varying eye sensitivity may be compensated in the final results in substantially the same manner as described hereinabove.

In meters of the aforementioned type the extent of dimming the light bundle (adjustment of the iris diaphragm or step wedge) necessary to reduce the viewing mark or aperture visibility to zero is an index of the existing object brightness. By properly coupling the dimming device with an adjustable calculator or an exposure control organ of a camera, the proper exposure setting may be determined or automatically adjusted.

An arrangement of the latter type embodying the improvement of the invention is shown in Figures 7 to 10. In the latter, item 30 indicates the lens and shutter casing of a camera of well known construction to which is attached an extension casing 31 enclosing the exposure control devices. The latter comprises a pair of photometric wedge elements 32 and 33 in the form of endless bands of Cellophane, cellulose derivative or the like passing over suitable guide rollers and arranged to move past a viewing aperture 38 in the top wall of the casing 31. The wedge bands 32 and 33 are provided with perforations engaged by sprocket wheels 35 and 37 which in turn cooperate with racks 34 and 36 secured to the aperture and shutter speed adjustments, respectively, in such a manner that by presetting one of the latter the other member may be adjusted automatically to the proper value by moving it to such a position that the visibility of the mark or aperture 38 relative to the surrounding standard area, which is preferably opaque or black, disappears or is just barely visible in the manner understood from the foregoing.

In order to consider the effect of the varying eye sensitivity the casing 31 is provided with two light admitting openings 39 and 40, respectively, a partially reflecting mirror 42 and a normal reflector 43 relatively arranged and cooperating in substantially the same manner as described hereinabove.

In the exemplification shown, the sighting aperture 38 is of diamond shape and in order to consider additional exposure controlling factors such as film speed, the size of the mark or aperture is made adjustable by the provision of a plate 44, Figure 11, having a diamond shaped aperture 45 and being slidably mounted beneath the opening 38. By moving plate 44 to the left or right by means of a knob 46 attached thereto and passing through a guide slot in the top of the casing, the size of the aperture or viewing mark and accordingly the visibility range thereof may be adjusted in accordance with other exposure controlling factors such as film speed as shown by the scale 47 cooperating with an index carried by the knob 46.

It will be evident from the foregoing that the invention is not limited to the specific details, arrangements of parts and steps disclosed and described herein for illustration, and that the underlying throught and novel principle will be susceptible of numerous variations and modifications coming within the broader scope and spirit of the invention as defined by the appended claims. The specification and drawings are accordingly to be regarded in an illustrative rather than in a limiting sense.

I claim:

1. A visual photographic exposure meter comprising a body member, a light gauge supported by said body member and having at least one light pervious test area adjacent to a substantially opaque standard area, means to illuminate one side of said light gauge by light rays within a predetermined limited acceptance angle substantially encompassing a photographic scene, if the meter held in the operative position at a distance from the observer's eye is pointed towards said scene, whereby the relative brightness contrast between said test and standard areas by viewing the opposite side of said light gauge is a measure of the scene brightness, means for visually determining and translating said brightness contrast into exposure adjusting values for a camera and means associated with said body member to admit further light rays to additionally illuminate said test area in the operative position of said meter, said further light rays being of predetermined relative intensity with respect to said first light rays and emanating from the space substantially outside said acceptance angle to which the eye is exposed, whereby to substantially compensate for the error due to the varying eye sensitivity under different general lighting conditions to which the eye is exposed.

2. A visual photographic exposure meter comprising a body member, a light gauge supported by said body member and having a series of adjacently situated light pervious test marks of progressively increasing contrast relative to substantially opaque surrounding areas, means to illuminate one side of said light gauge by light rays within a predetermined limited acceptance angle substantially encompassing a photographic scene, if the meter held in the operative position at a distance from the observer's eye is pointed towards said scene, whereby the mark of said wedge just barely visible is an index of the scene brightness, means for interpreting a scene brightness indicated in exposure adjusting values for a photographic camera and means associated with said body member to admit further light rays in the operative position of said meter of predetermined relative intensity with respect to said first light rays and emanating from the space substantially exterior of said acceptance angle to which the eye is exposed, whereby to additionally illuminate said test marks so as to substantially compensate for the error due to the varying eye sensitivity under different general lighting conditions to which the eye is exposed.

3. A visual photographic exposure meter comprising a body member provided with a pair of light admitting openings and a viewing opening, means to provide a first light passage between the first of said light admitting openings and said viewing opening, a light gauge located in said light passage and having at least one light pervious test area adjacent to a substantially opaque standard area, said light gauge viewed through said viewing opening held at a distance from the observer's eye being spaced from said first opening by a predetermined distance whereby said test area is illuminated by light rays within a predetermined limited acceptance angle and emanating from and substantially encompassing a photographic scene, if the meter in the operative position is held with said first light admitting opening aimed towards said scene and whereby the relative brightness contrast between said test and standard area is a measure of the scene brightness, means for visually determining and translating said brightness contrast into exposure adjusting values for a camera, means to provide a further light passage between the second of said light admitting openings and said viewing opening, said second light passage partly coinciding with said first light passage and including said light gauge, said second light admitting opening being designed and located relative to said first opening to admit further light rays in the operative position of said meter of predetermined relative intensity with respect to said first light rays and emanating from the space exterior of said acceptance angle and to which the observer's eye is exposed, whereby to additionally illuminate said test area to substantially compensate for the error due to the varying eye sensitivity under different general lighting conditions to which the eye is exposed.

4. A visual photographic exposure meter comprising a body member provided with a pair of light admitting openings and a viewing opening, means to provide a first light passage between the first of said light admitting openings and said viewing opening, a light gauge comprising a substantially opaque element and a photometric wedge adjacent to and movable past said element, whereby the extent of movement of said wedge to cause the outline of said element to be just barely visible is a measure of the wedge illumination, said light gauge viewed through said viewing opening held at a distance from the observer's eye being spaced from said first opening by a predetermined distance whereby to be illuminated by light rays within a predetermined limited acceptance angle emanating from and substantially encompassing a photographic scene, if the meter in the operative position is held with said first light admitting opening pointed towards said scene, means for translating the movement of said wedge into exposure adjusting values of a camera, means to provide a further light passage between the second of said light admitting openings and said viewing opening, said second light passage partly coinciding with said first light passage and including said light gauge, said second light admitting opening being designed and located relative to said first opening to admit further light rays in the operative position of the meter of predetermined relative intensity and emanating from the space exterior of said acceptance angle and to which the observer's eye is exposed, whereby to additionally illuminate said wedge to substantially compensate for the error due to the varying eye sensitivity under different general lighting conditions to which the eye is exposed.

5. A visual photographic exposure meter comprising a body member provided with a pair of light admitting openings and a viewing opening, means to provide a first light passage between the first of said light admitting openings and said viewing opening, a photometric wedge located in said light passage and having a series of adjacently situated test marks of varying transparency surrounded by substantially opaque areas, said wedge viewed through said viewing opening held at a distance from the observer's eye being spaced from said first opening by a predetermined distance whereby said marks are illuminated by light rays within a predetermined limited acceptance angle and emanating from and substantially encompassing a photographic scene, if the meter in the operative position is held with said first light admitting opening pointed towards the scene, and whereby the mark of said wedge being just barely visible is an index of the scene brightness, means for translating a scene brightness indicated into exposure adjusting values of a camera, means to provide a second light passage between the second of said light admitting openings and said viewing opening, said second light passage partly coinciding with said first light passage and including said wedge, and being designed and located relative to said first light passage to admit further light rays in the operative position of the meter of predetermined relative intensity with respect to said first light rays and emanating from the space substantially outside said acceptance angle and to which the observer's eye is exposed, whereby to additionally illuminate said test marks to substantially compensate for the error due to the varying eye sensitivity under different general lighting conditions to which the eye is exposed.

6. A visual photographic exposure meter comprising a body member provided with a pair of light admitting openings and a viewing opening, means to provide a light passage between the first of said light admitting openings and said viewing opening, a light gauge located in said light passage and having a series of adjacently situated light pervious test areas of progressively varying contrast relative to their surrounding areas, said light gauge viewed through said viewing opening held at a distance from the observer's eye being spaced from said first opening by a predetermined distance whereby said marks are illuminated by light rays within a predetermined limited acceptance angle and emanating from and substantially encompassing a photographic scene, if the meter in the operative position is held with said first light admitting opening pointed towards said scene and whereby the mark of said light gauge being just barely visible is an index of the scene brightness, means for translating a scene brightness indicated into exposure adjusting values of a camera and means associated with said body member to provide a further light passage between the second of said light admitting openings and said viewing opening, said second light passage partly coinciding with said first light passage and including said light gauge and said second light admitting opening being designed and located relative to said first opening to admit additional light rays in the operative position of said meter of predetermined relative intensity with respect to said first light rays and emanating from the space exterior of said acceptance angle and to which the observer's eye is exposed, whereby to additionally illuminate said light gauge to substantially compensate for the error due to the varying eye sensitivity under different general lighting conditions to which the eye is exposed.

7. A visual photographic exposure meter comprising a body member provided with a pair of light admitting openings and a viewing opening, means to provide a first light passage between the first of said light admitting openings and said viewing opening, a light gauge located in said light passage and having at least one light pervious test area adjacent to a substantially opaque standard area, said light gauge viewed through said viewing opening held at a distance from the observer's eye being spaced from said first light admitting opening by a predetermined distance whereby said test area is illuminated by light rays within a predetermined limited acceptance angle and emanating from and substantially encompassing a photographic scene, if the meter in the operative position is held with said first light admitting opening pointed towards said scene and whereby the relative brightness contrast between said test and standard areas is a measure of the scene brightness, means for visually determining and translating said brightness contrast into exposure adjusting values of a camera, means to provide a further light passage between the second of said light admitting openings and said viewing opening, said second light passage partly coinciding with said first light passage and including said light gauge and said second light admitting opening being located relative to said first opening to admit further light rays in the operative position of said meter emanating from the space exterior of said acceptance angle and to which the observer's eye is exposed, and a light absorbing member in the path of said second light passage to adjust the relative intensity of said further light rays with respect to said first light rays, whereby to additionally illuminate said test area to substantially compensate for the error due to the varying eye sensitivity under different general lighting conditions to which the eye is exposed.

KARL RATH.